May 29, 1928.
L. A. WECHSLER
COAL SAVING SHOVEL
Filed Nov. 7, 1927
1,671,800
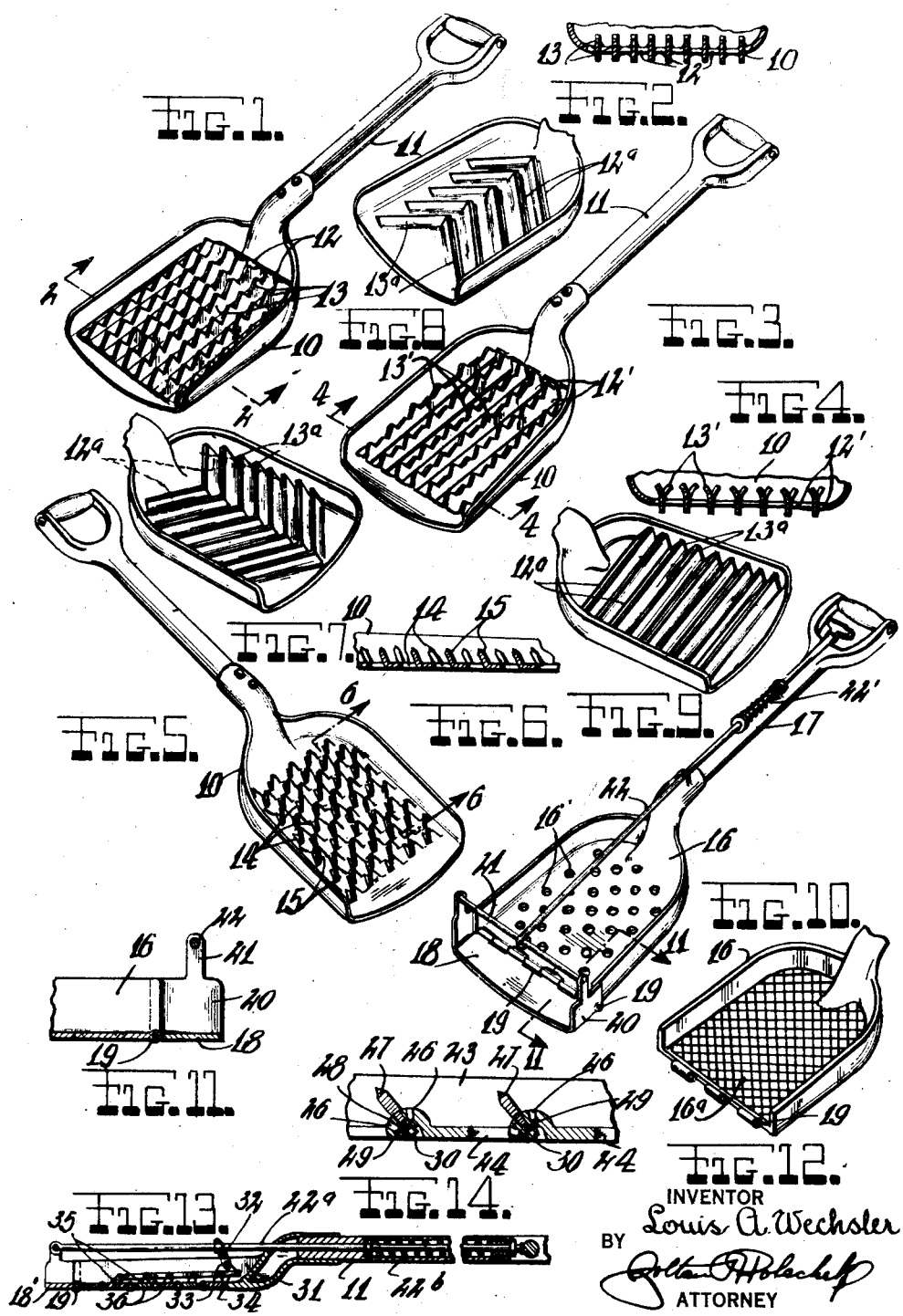

Patented May 29, 1928.

1,671,800

UNITED STATES PATENT OFFICE.

LOUIS A. WECHSLER, OF BELLAIRE, NEW YORK.

COAL-SAVING SHOVEL.

Application filed November 7, 1927. Serial No. 231,460.

This invention relates generally to shovels, and has more particular reference to a novel screening shovel.

The invention has for an object the provision of a shovel of the class mentioned which is of simple durable construction, desirable and efficient in action, and which can be manufactured and sold at a reasonable cost.

The shovel has its shovel body formed with slots and with serrated ridges, either longitudinally or transversely thereof, or simply with serrations stamped from the body so as to leave apertures. When this shovel is forced into a pile of ashes and withdrawn, the serrations pick the pieces of coal therefrom, and allow the ash to fall thru the slots or apertures. Furthermore the shovel may be provided with an adjustable front so as to be capable of holding shovelled material from falling off, and the above referred to serrations may be adjustable to change the angular tilt thereof and to vary the passage size of the slots or apertures.

For further comprehension of the invention, and of the objects and advantages thereof, reference will be had to the following description and accompanying drawings, and to the appended claims in which the various novel features of the invention are more particularly set forth.

Referring to the accompanying drawing, forming a material part of this disclosure:—

Fig. 1, is a perspective view of a shovel constructed according to this invention.

Fig. 2, is a transverse vertical sectional view thereof, taken on the line 2—2 of Fig. 1.

Fig. 3 is a perspective view of a shovel constructed according to a modification of the invention.

Fig. 4, is a transverse vertical sectional view thereof, taken on the line 4—4 of Fig. 3.

Fig. 5, is a perspective view of a shovel constructed according to another modification of the invention.

Fig. 6, is a fragmentary vertical sectional view, taken on the line 6—6 of Fig. 5.

Figs. 7, 8 and 9 are perspective views of a shovel body constructed according to other modifications.

Fig. 10, is a perspective view of a shovel constructed according to another modification of the invention.

Fig. 11, is a fragmentary vertical sectional view, taken on the line 11—11 of Fig. 8.

Fig. 12, shows a perspective view of a shovel body constructed according to a different modification.

Fig. 13, is a longitudinal sectional view taken thru the center of the shovel, constructed according to a still further modification.

Fig. 14, is a fragmentary vertical sectional view similar to Figs. 2, 4 and 6, but of modified form.

The reference numeral 10 indicates generally a shovel body of any design and construction, and 11 a handle connected therewith.

The shovel body shown in Fig. 1, is formed with a plurality of parallel longitudinal slots 12 formed by stamping away portions of the body, and bending other portions substantially vertical, formed with serrations 13.

The shovel body shown in Fig. 3 is formed with a plurality of parallel transverse slots 12' formed by stamping away portions of the body, and bending other portions substantially vertical, formed with alternately bent serrations 13'.

The shovel body shown in Fig. 5 is formed with a plurality of apertures 14 formed by stamping serrations 15 from the body.

The shovel bodies shown in Figs. 7 and 8 show a plurality of angular slots 12ª formed by stamping of the body and bending other portions 13ª angularly.

The shovel body shown in Fig. 9, shows similar stamped away portions of the body and other portions are bent angularly so as to form parallel inclined flanges.

The modification of the invention illustrated in Figs. 10, 11 and 12 discloses a shovel body 16 having handle 17 connected therewith. An extension member 18 is hingedly connected as at 19 to the front of the body 16, and has vertical sides 20 in a plane adjacent the outer sides of the shovel body, so that this extension member may swing from horizontal to vertical positions. In the horizontal position the shovel may be forced into material to be shovelled, and in the vertical position of the extension the front of the shovel body is obstructed preventing material on the shovel to fall therefrom. A rod 21 is attached across the extension member, and another rod 22 connects with this rod and leads along the handle 17, so as to be in a convenient position for manual manipulation to move the extension member.

A spring 22′ is provided to return the extension member 18 in alignment with the base of the shovel body 16. Perforations 16′ of any suitable size and spacing or screens 16ª of suitable mesh may be provided in the base of the shovel body 16.

In Fig. 13 rod 22ª is shown to be passing thru handle 17′ and is holding extension member 18′ in normally aligned position with the base of the shovel body 31 by means of spring 22ᵇ. Rod 22ª is connected to one end of a bellcrank 32 which is pivoted as at 33 and the other end of the said bellcrank is connected to a link 34. This link is pivotally secured to angular extensions 35 of hinged shutters 36 so that when the operating rod 22ª is pulled, shutters 36 will swing from their horizontal positions upwardly simultaneously with extension member 18′.

Fig. 14 shows a shovel body 23 formed with openings 24, and enlarged portions 25 on one of the sides of the openings. The enlarged portions have slots 26, and serration members 27 have reduced ends 28 engaging in the slots. Studs 29 project from the reduced ends 28 and nuts 30 engage the studs to hold the serration members. The angular tilt of the serration members or the passage size of the openings 24 may be changed by removing the serration members from one of the slots in the enlarged portions, and re-engaging in other slots.

Having thus described my invention, what I claim as new, and desire to secure by United States Letters Patent is:—

1. A shovel of the class described, comprising a shovel body having certain openings, and adjustable serration members adjacent said openings.

2. A shovel of the class described, comprising a shovel body having certain openings, enlarged portions adjacent the openings, and provided with means for holding serration member in different positions, and serration members engaged in the said holding means.

3. A shovel of the class described, comprising a shovel body, an extension member and manual operable means for obstructing the said extension member in the front of the shovel for preventing material falling therefrom, hinged shutter members located in the base of the shovel body and means for simultaneously manipulating said shutter members with said extension member.

In testimony whereof I have affixed my signature.

LOUIS A. WECHSLER.